United States Patent [19]

Tanaka et al.

[11] Patent Number: 5,817,255

[45] Date of Patent: Oct. 6, 1998

[54] DISPLAY AND METHOD FOR PRODUCING IT

[75] Inventors: Akira Tanaka, Kawasaki; Tetsuo Hattori, Yokohama; Motoyuki Toki, Kyoto, all of Japan

[73] Assignee: Nikon Corporation, Tokyo, Japan

[21] Appl. No.: 705,525

[22] Filed: Aug. 29, 1996

[30] Foreign Application Priority Data

Aug. 30, 1995 [JP] Japan ................................ 7-222225
Jul. 9, 1996 [JP] Japan ................................ 8-179695

[51] Int. Cl.$^6$ ............................... C09K 19/52; F21V 9/00
[52] U.S. Cl. .......................... 252/582; 252/299.01; 428/1
[58] Field of Search ............... 252/582, 299.01; 428/1

[56] References Cited

U.S. PATENT DOCUMENTS

| | | | |
|---|---|---|---|
| 4,944,895 | 7/1990 | Buckley et al. | 252/299.01 |
| 5,198,269 | 3/1993 | Swartz et al. | 427/226 |
| 5,260,815 | 11/1993 | Takizawa | 359/41 |
| 5,449,733 | 9/1995 | Zyss et al. | 528/9 |
| 5,478,611 | 12/1995 | Hashimoto | 428/1 |
| 5,534,748 | 7/1996 | Oomen | 313/479 |
| 5,580,619 | 12/1996 | Sakai et al. | 428/1 |
| 5,580,819 | 12/1996 | Li et al. | 427/167 |
| 5,589,237 | 12/1996 | Akashi et al. | 428/1 |
| 5,618,872 | 4/1997 | Pohl et al. | 524/430 |

OTHER PUBLICATIONS

First European Workshop on Hybrid Organic–Inorganic Materials (1993), pp. 75–95.

*Primary Examiner*—C. H. Kelly
*Attorney, Agent, or Firm*—Shapiro and Shapiro

[57] ABSTRACT

A display has a liquid crystal composite layer interposed between a pair of substrates on which electrodes-are formed. The liquid crystal composite layer is comprised of a matrix and liquid crystal droplets dispersed therein. The matrix is composed of an inorganic oxide or its gel of the formula MOx (M: one or more metal elements selected from, La, Y, Ti, Zr, Hf, V, Nb, Ta, Al, Ga, Ge, Pb or Sb; x: half of the total valence number of the one or more metal elements), or a mixture thereof with an inorganic oxide or its gel of formula ABOx (A: one or more metal elements selected from alkaline earth metals, rare earth metals or Pb; B: one or more metal elements of transition metals; x: a number larger than 0 (zero) and not-larger than 3). A polymer soluble in polar solvent may be added to adjust the dielectric constant of the matrix.

38 Claims, 3 Drawing Sheets

DISPLAY AND METHOD FOR PRODUCING IT

BACKGROUND OF THE INVENTION

1. Field of the Invention

The present invention relates to a display such as a liquid crystal panel used for display and a liquid crystal light valve (or liquid crystal modulation element) used in a projector of a Schlieren optical system or the like, and more specifically to a liquid crystal layer functioning as a light modulation section.

2. Related Background Art

Figure 3:
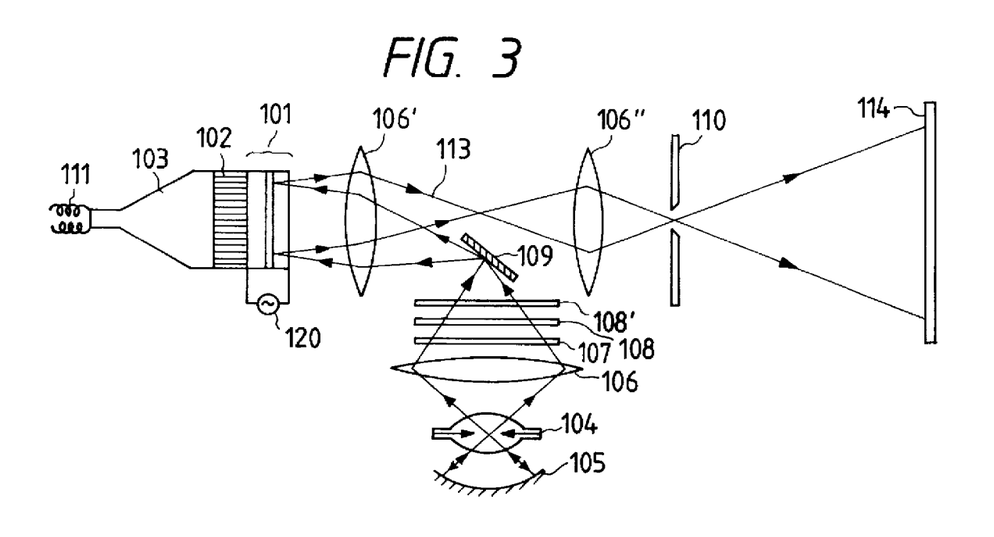
FIG. 3 is a structural drawing of a projector of the Schlieren system using a light valve.

FIG. 3 is a schematic view of a conventional projector with a Schlieren optical system (FIG. 1 shown in IPC International Patent Publication No. WO 91/02429). The light source is comprised of a xenon, halogen or metal halide lamp 104 and a concave mirror 105 made of an elliptical or spherical surface disposed behind said lamp 104. White light emitted from said light source passes through a collection lens 106, an IR cut-off filter 107, a UV cut-off filter 108 and a visible light filter 108', is changed in its optical path by means of a reflecting mirror 109, passes through a lens 106', and is incident upon a space light modulating element 101 (or light valve). The image optics system has a lens 106' and an aperture 110. Projection light 113 emitted from the light valve 101 passes through the lenses 106' and 106" and is projected on the screen 114. From FIG. 3, it can be understood that the projection light 113 emitted from said light valve 101 goes along a path different from that of the readout light incident upon light valve 101, thus constituting a Schlieren optical system.

Figure 4:
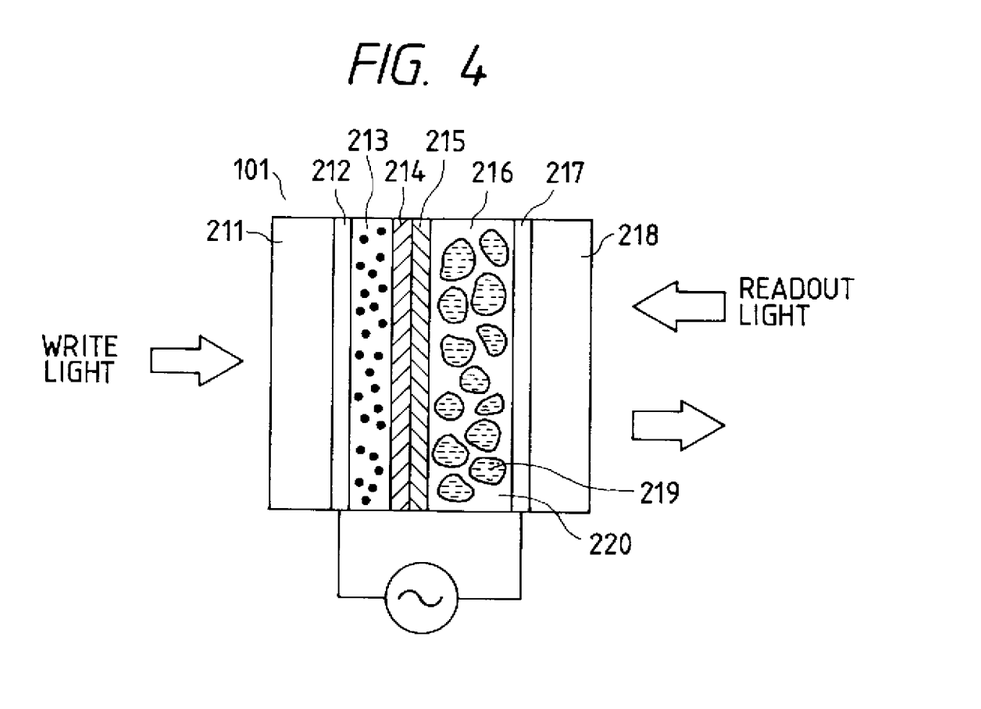
FIG. 4 is a sectional view of a conventional light valve.

FIG. 4 shows the structure of a light valve 101 employed in a conventional Schlieren optical system. When taken in order from the left of FIG. 4 (i.e., from the write light side), the components are a transparent glass substrate 211, a transparent electrode (ITO film) 212, a photoconductor layer 213 made of a CdTe film, a hydrogenated amorphous silicon film, a thin BSO single crystal material or the like, a light shield layer 214 made of a CdTe film or the like, a dielectric multi-layer film mirror layer 215, a liquid crystal composite film 216 with liquid crystal 219 dispersed in a transparent resin matrix 220, a transparent electrode (ITO film) 217 and a transparent glass substrate 218. An AC voltage is always applied between the ITO films 212 and 217. If no write light is incident from the left side of FIG. 4, the impedance of the photoconductor layer 213 is high, so that hardly any voltage is applied to the liquid crystal composite layer 216 and liquid crystal molecules confined in the resin matrix face individually toward arbitrarily random directions. Then the refractive index of a liquid crystal differs from that of the resin matrix, and hence, readout light incident upon said light valve from the right side of FIG. 4 is scattered due to the difference in the refractive index between liquid crystal molecules facing toward randomly oriented directions and the resin matrix. On the other hand, if write light is incident from the left side of FIG. 4, the impedance of the photoconductive layer 213 decreases due to irradiation of said incident light, so that a voltage is applied to the liquid composite layer 216 and the liquid crystal molecules in the liquid crystal are oriented due to the electric field generated by the applied voltage. When liquid crystal molecules are oriented, the refractive index of liquid crystals and that of the resin matrix are approximately in agreement with each other and the liquid crystal composite layer film 216 becomes transparent when viewed from the write light. Under this condition, the readout light incident upon the light valve passes through the transparent liquid composite layer 216, is reflected again from the dielectric mirror layer 215, passes again through the liquid crystal layer 216, and is emitted from the light valve. The light shield layer 214 is provided to absorb the light passing through the dielectric mirror layer 215 out of the incident readout light and prevent the photoconductor layer 213 adjacent thereto from being affected. The liquid crystal composite layer heretofore in use was of a polymer dispersion type in which acryl polymer was employed as a base into which liquid crystal was dispersed.

A conventional polymer dispersion type light valve has such a drawback that no switching between the random state and the transparent state of liquid crystal molecules dispersed in an acrylic resin can be formed unless a high voltage ranging from 100V to 200V is applied. The inventors of the present invention studied a light valve and found that the need for such a high voltage was attributable to the following reason. That is, because the structure is employed in which liquid crystal is dispersed in acrylic resin, when a voltage is applied to the liquid crystal composite body on incidence of write light, the actual voltage applied to the liquid crystal part is reduced, thereby requiring a rise in voltage applied between the electrodes. As it is desirable to maintain the basic function of this light valve utilizing the scattering and the transparency of incident light due to a change in the molecular arrangement of liquid crystals, it is necessary to disperse liquid crystals in some other matrix materials, leading the inventors to the idea that the matrix is changed from a polymer material such as acrylic polymer to other materials. The dielectric constant of acrylic polymer is 3–5 and polymers having a dielectric constant over 10 can hardly be obtained, so that it is impossible to decrease the voltage to be applied.

As another matrix material, there is a glass formation by the sol-gel method. A contribution was made by D. Levy to the collected papers, First European Workshop on Hybrid Organic Materials (1993), pp. 77–95, in which a liquid crystal panel with TN liquid crystal dispersed into a silica matrix prepared by the sol-gel method is described and introduced as Gel-glass Dispersed Liquid Crystal (GDLC). As described there, however, the refractive index of the gel film in a silica base is about 1.43, a refractive index matching a normal liquid crystal can hardly be obtained and a light valve employing this was not able to take a large switching ratio due to such characteristics.

OBJECT OF THE INVENTION

An object of the present invention is to provide a display such as a liquid crystal panel used for display and a liquid crystal light valve (or liquid crystal modulation element) used in a projector of the Schlieren optical system, etc., enabling a voltage applied to liquid crystal to be reduced by using as a matrix a high dielectric film in which liquid crystal is dispersed uniformly, and a method for producing the display.

SUMMARY OF THE INVENTION

The present invention is based on the discovery that the above problems are solved by using as a matrix material i) a dielectric gel or dielectric material having a high dielectric constant, such as barium titanate produced by a sol-gel method; ii) a composite material the dielectric constant of which has been adjusted by mixing the aforementioned dielectric gel or dielectric material with a material having a low dielectric constant such as silica produced by a sol-gel method; or iii) a material the dielectric constant of which has been adjusted by mixing the above i) or ii) with an organic polymer soluble in a polar solvent.

The present invention can provide the following displays:

(1) a display with a liquid crystal composite layer inserted between electrodes, wherein said liquid crystal composite layer contains liquid crystal dispersed into a matrix comprising inorganic oxide gel or inorganic oxide represented by the chemical formula MOx (M: one or more metal elements selected from La, Y, Ti, Zr, Hf, V, Nb, Ta, Al, Ga, Ge, Pb and Sb; x: half of the total valence number of the one or more metal elements);

(2) a display with a liquid crystal composite layer inserted between electrodes, wherein said liquid crystal composite layer contains liquid crystals dispersed into an inorganic oxide gel matrix or inorganic oxide matrix comprising a mixture of an inorganic oxide gel or inorganic oxide represented by the chemical formula MOx (M: one or more metal elements selected from Si, La, Y, Ti, Zr, Hf, V, Nb, Ta, Al, Ga, Ge, Pb or Sb; x: half of the total valence number of the one or more metal elements) and an inorganic oxide gel or inorganic oxide represented by the chemical formula ABOx (A: one or more metal elements selected from alkaline earth metals, rare earth metals or Pb; B: one or more metal elements selected out of transition metals; x: a number larger than 0 (zero) and not larger than 3 (i.e., $0 < x \leq 3$));

(3) a display with a liquid crystal composite layer inserted between electrodes, wherein said liquid crystal composite layer contains liquid crystal dispersed into an inorganic-organic hybrid matrix comprising a mixture of an inorganic oxide gel or inorganic oxide represented by the chemical formula MOx (M: one or more metal elements selected from Si, La, Y, Ti, Zr, Hf, V, Nb, Ta, Al, Ga, Ge, Pb or Sb; x: half of the total valence number of the one or more metal elements) and an organic polymer;

(4) a display with a liquid crystal composite layer inserted between electrodes, wherein said liquid crystal composite layer contains liquid crystal dispersed into an inorganic-organic hybrid matrix comprising an inorganic oxide gel or inorganic oxide represented by the chemical formula ABOx (A: one or more metal elements selected from alkaline earth metals, rare earth elements or Pb; B: one or more metal elements selected from transition metals; x: a number larger than 0 (zero) and not larger than 3 (i.e., $0 < x \leq 3$)) and an organic polymer; and (5) a display with a liquid crystal composite layer inserted between electrodes, wherein said liquid crystal composite layer contains liquid crystals dispersed into an inorganic-organic hybrid matrix comprising a mixture of an inorganic oxide gel or inorganic oxide represented by a chemical formula MOx (M: one or more metal elements selected out of Si, La, Y, Ti, Zr, Hf, V, Nb, Ta, Al, Ga, Ge, Pb or Sb; x: half of the total valence number of the one or more metal elements), an inorganic oxide gel or inorganic oxide represented by a chemical formula ABOx (A: one or more metal elements selected from alkaline earth metals, rare earth elements or Pb; B: one or more metal elements selected from transition metals; x: a number larger than 0 (zero) and not larger than 3 (i.e., $0 < x \leq 3$)) and an organic polymer.

Furthermore, the present invention provides a method for producing a liquid crystal panel, which comprises the steps of: mixing a matrix material with liquid crystal in a sol stage by use of ultrasonic waves to prepare a liquid crystal dispersion sol, applying this liquid crystal dispersion sol to a substrate for a liquid crystal panel, then allowing the dispersion sol to gelate by heat treatment, and sticking the opposite substrate to make up a liquid crystal panel.

DESCRIPTION OF THE PREFERRED EMBODIMENTS

Embodiments of the present invention will be described below.

(Preparation of silica ($SiO_2$) sol 1)

Isopropyl alcohol (IPA) as a solvent is added to silicon tetraethoxide ($Si(OEt)_4$) where a metal element M and an alkyl group R in metal alcoxide ($M(OR)_{2x}$) are Si and ethyl, respectively. Water is added dropwise to this solution to obtain hydroxide $Si(OH)_4$. Thus, silica ($SiO_2$) sol 1 is prepared.

In this embodiment, Si and ethyl were employed as a metal element M and an alkyl group R, respectively, while La, Y, Ti, Zr, Hf, V, Nb, Ta, Al, Ga, Ge, Pb and Sb may be also employed as M, and methyl, isopropyl and butyl may be also employed as R.

(Preparation of barium titanate ($BaTiO_3$) sol)

Isopropyl alcohol (IPA) as a solvent is mixed with titanium tetra-isopropoxide ($Ti(OPr)_4$) where Ti and isopropyl are employed as a metal element M and an alkyl group R in metal alkoxide ($M(OR)_{2x}$), respectively, and $Ba(OPr)_2$ synthesized by reaction of isopropyl alcohol with barium metal to make a uniform mixture solution. Water is added dropwise to this solution to obtain a hydroxide containing titanium and barium.

In this embodiment, Ti and isopropyl were employed as a metal element M and an alkyl group R in the first metal alkoxide, respectively, and Ba and isopropyl were employed as a metal element M and an alkyl group R in the second metal alkoxide, respectively, while Zr and Cr may be also employed as M in the first metal alcoxide, and Ca, Sr, Pb and La may be also employed as M in the second metal alkoxide. In addition, as an alkyl group R, ethyl group and butyl group may be also substituted for isopropyl.

(Preparation of silica sol 2 ($CH_3SiO_{1.5}$ sol))

Isopropyl alcohol (IPA) as a solvent is added to monomethyl triethoxy silicon ($Si(OEt)_3Me$). Water is added dropwise to this solution to obtain a hydroxide. In this manner, silica sol 2 ($CH_3SiO_{1.5}$ sol) is prepared.

(Preparation of a sol mixture)

Silica sol 1 and barium titanate sol are mixed with stirring by the use of a magnetic stirrer to prepare sol mixture 1. The mixing ratio is determined according to the refractive index of the gel made out of the sol mixture and that of liquid crystal to be dispersed.

Barium titanate sol and silica sol 2 are mixed with stirring by the use of a stirrer to prepare sol mixture 2. The mixing ratio is determined according to the refractive index of the gel made out of the sol mixture and that of liquid crystal to be dispersed.

Silica sol 1, barium titanate sol and silica sol 2 are mixed with stirring by the use of a magnetic stirrer to prepare sol mixture 3.

The mixing ratio is determined according to the refractive index of the gel made out of the sol mixture and that of liquid crystal to be dispersed.

(Preparation of a polymer sol mixture)

A polymer soluble in a polar solvent is added to either the above prepared sol or sol mixture to prepare a polymer sol mixture. The mixing ratio is determined according to the refractive index of the gel made out of the sol or sol mixture and that of liquid crystals dispersed.

As a polymer soluble in a polar solvent, polyvinyl pyrolidone, polyethyl oxazoline, polyvinyl acetate, polyvinyl alcohol, polymethacrylates, polyurethane, polyamide such as nylon, etc. may be employed. The polar solvent includes alcohols such as ethyl alcohol and isopropyl alcohol, water, amides such as dimethyl formaldehyde, esters such as ethyl acetate, and ketones such as acetone and methyl ethyl ketone.

(Dispersing liquid crystals into sol)

As a dispersing method for dispersing liquid crystal into a sol, a sol mixture or a polymer sol mixture, ultrasonic waves are employed.

By using ultrasonic waves, barium titanate sol and TN liquid crystal are mixed and liquid crystal are dispersed to prepare a liquid crystal dispersion gel. Uniform dispersion is extremely difficult to make with dispersing using ordinary mechanical stirring.

As in the above embodiment, the sol mixture and TN liquid crystal are mixed and liquid crystal are dispersed into the sol by using ultrasonic waves.

(Preparation of a liquid crystal panel)

The liquid crystal dispersion sol prepared in any one of the above embodiments is applied on one side of a panel substrate of glass on which side an electroconductive film is formed, and the sol is allowed to gel, and then the similar substrate is stuck on the gel, thereby preparing a liquid crystal display panel. Where that substrate is a substrate for a light valve comprised of a transparent conductive film, a photoconductor film and a light shielding layer formed on a glass substrate, the light valve can be prepared by applying the liquid crystal dispersion sol to the substrate, allowing the sol to gel and sticking another substrate on the gel.

As stated above, when both of the high dielectric constant material, such as barium titanate sol, and the low dielectric constant matrix material, such as silica sol, are prepared by the sol-gel method using alkoxide or the like as a sol material, the composite sol having good compatibility and a desirable dielectric constant and refractive index can be obtained. Furthermore, when the organic polymer soluble in polar solvent is mixed with the composite sol in a sol stage, the dielectric constant and refractive index can be finely adjusted. Since the sol mixture obtained in such a manner is homogeneous, a liquid crystal dispersion sol mixture in which liquid crystal is dispersed uniformly can be obtained by ultrasonic dispersing. On gelation of this sol mixture, the high dielectric constant film in which liquid crystal is uniformly dispersed is formed on the substrate. The high dielectric constant film having therein uniformly dispersed liquid crystal is interposed between a pair of transparent substrates having transparent-electrodes to form a liquid crystal panel. When applying a voltage between the electrodes of this liquid crystal panel to operate the panel, an inter-electrode voltage required for the orientation of liquid crystal molecules can be reduced because the electric field induced in liquid crystal is increased due to the high dielectric constant of the matrix in which liquid crystal is dispersed. In using this as a display panel, it is further required that the configuration of liquid crystal molecules changes depending on the presence or absence of applied voltage, thereby resulting in a change in the refractive index of the liquid crystal so that the panel becomes transparent when the matrix and the liquid crystal are equal in their refractive indexes and light is scattered when the two are different in their refractive indexes. It is just as mentioned above that the refractive index determined depending on the configuration of liquid crystal molecules can be so set as to be nearly equal to that of the matrix.

The following Examples are given for the purpose of illustrating the present invention and should not be construed as being limitations of the present invention.

EXAMPLES

As liquid crystals to be dispersed into sol being prepared, three types manufactured by MERCK, TN liquid crystal $E_7$ ($n_e$=1.746, $n_o$=1.5211, $n_a$=1.6337), TN liquid crystal $E_{100}$ ($n_e$=1.7072, $n_o$=1.5191, $n_a$=1.6131), and positive type liquid crystal BDH-T1203 ($n_e$=1.7299, $\Delta n$=−0.2013, n (random state)=1.62925, $\in_{\parallel}$=15.2, $\Delta\in$=11.0) were employed. The value $n_a$ is the refractive index of the liquid crystal when the liquid crystal molecules are oriented randomly with respect to the substrate. The value $n_a$ is the refractive index of the liquid crystal when the liquid crystal molecules are oriented in parallel to the substrate. The value $n_o$ is the refractive index of the liquid crystal when the liquid crystal molecules are oriented at right angles (orthogonally) to the substrate.

Example 1

(Preparation of silica sol 1 ($SiO_2$ sol))

The 240 g of isopropyl alcohol (IPA) was added to 208 g of silicon tetraethoxide ($Si(OEt)_4$) as a solvent and 72 g of water was added dropwise to this solution to prepare silica sol 1 ($SiO_2$ sol). The solid content of this sol was 11.5 wt %, and after gelation and solidification of this sol, the refractive index n was 1.43 and the relative dielectric constant $\in$ was 2.2.

(Preparation of titania sol ($TiO_2$ sol))

The 3600 g of isopropyl alcohol (IPA) was added to 284 g of titanium tetraisopropoxide ($Ti(OC_3H_7)_4$) as a solvent, and 27 g of water was added dropwise to this solution, obtaining $TiO_2$ sol. The solid content of this sol was 2 wt %, and after gelation and solidification of this sol, the refractive index n was 1.80 and the relative dielectric constant $\in$ was 40.

Example 2

(Preparation of barium titanate sol ($BaTiO_3$ sol))

Using 11000 g of isopropyl alcohol (IPA) as a solvent, 284 g of titanium tetraisopropoxide ($Ti(OC_3H_7)_4$) and 255 g of barium diisopropoxide ($Ba(OC_3H_7)_2$) were mixed together, and 36 g of $H_2O$ ($HNO_3$ catalyst) was added dropwise to this solution to prepare barium titanate ($BaTiO_3$). The solid content of this sol was 2 wt %, and after gelation and solidification of this sol, the refractive index n was 2.3 and the relative dielectric constant $\in$ was 150.

Example 3

(Preparation of silica sol 2 ($CH_3SiO_{1.5}$ sol))

The 240 g of isopropyl alcohol (IPA) was added to 178 g of silicon monomethyl tetraethoxide ($Si(OC_2H_5)_3CH_3$) as a solvent, and 54 g of water was added dropwise to this solution, obtaining $CH_3SiO_{1.5}$ sol. The solid content of this sol was 14.2 wt %, and after gelation and solidification of this sol, the refractive index n was 1.4 and the relative dielectric constant E was 2.0.

Example 4

(Preparation of sol mixture 1)

The 6.65 g of silica sol 1 prepared in Example 1 was mixed with 11.75 g of barium titanate sol prepared in Example 2, preparing a sol mixture. The ratio of $SiO_2$ to $BaTiO_3$ as the solid content was 0.765:0.235, the solid content was 5.4 wt %, and after gelation and solidification of this sol, the refractive index n was 1.634 and the relative dielectric constant $\in$ was 37. Consequently, the refractive index n was consistent with $n_a$ of the aforementioned liquid crystal $E_7$.

Example 5

(Preparation of sol mixture 2)

The 5.21 g of silica sol 2 prepared in Example 3 was mixed with 13 g of barium titanate sol prepared in Example 2, preparing a sol mixture. The ratio of $CH_3SiO_{1.5}$ to $BaTiO_3$ as the solid content was 0.740:0.260, the solid content was 5.5 wt %, and after gelation and solidification of this sol, the refractive index n was 1.634 and the relative dielectric constant Å was 40. Consequently, the refractive index n was consistent with $n_a$ of the aforementioned liquid crystal $E_7$.

Example 6

(Preparation of sol mixture 3)

The 3.27 g of silica sol 1 prepared in Example 1, 2.65 g of silica sol 2 prepared in Example 3 and 12.35 g of barium titanate sol prepared in Example 2 were mixed together, preparing a sol mixture 3. The ratio of $SiO_2.CH_3SiO_{1.5}:BaTiO_3$ as the solid content was 0.376:0.376:0.247, the solid content was 5.5%, and after gelation and solidification, the refractive index n was 1.634 and the relative dielectric constant $\in$ was 38.7. Consequently, the refractive index n was consistent with $n_a$ of the aforementioned liquid crystal $E_7$.

Example 7

(Preparation of polymer sol mixture)

The 0.865 g of polyvinyl pyrolidone (refractive index n=1.53, relative dielectric constant $\in$=5) was mixed with 6.75 g of barium titanate sol prepared in Example 2, preparing a polymer sol mixture (hybrid sol). The solid content was 13.1 wt %, and after gelation and solidification of this sol, the refractive index n was 1.634 and the relative dielectric constant was 24.6. Consequently, the refractive index n was consistent with $n_a$ of the aforementioned liquid crystal $E_7$.

Example 8

(Dispersing of liquid crystal into sol)

The 100 g of barium titanate sol prepared in Example 2 was mixed with 2 g of the liquid crystal $E_7$ ($n_e$=1.746, $n_o$=1.5211, $n_a$=1.6337) manufactured by MERCK and dispersed with ultrasonic waves, producing the droplets of liquid crystal in the barium titanate sol. However, the refractive index of barium titanate sol was as high as 2.3, and could not be made consistent with any refractive index of the liquid crystals $E_7$. This is always in a scattering state and transparent state could not be formed, so that the display function could not be developed.

Example 9

(Dispersing of liquid crystal into sol mixture 1)

The 100 g of the sol mixture of silica sol 1 and barium titanate sol prepared in Example 4 was mixed with 7 g of the liquid crystal $E_7$ and dispersed with ultrasonic waves to prepare a composite film containing the droplets of the liquid crystal and the sol as a matrix. As stated in Example 4, the film solidified by gelation had a refractive index of n=1.63 and was approximately in agreement with that of liquid crystal droplets $n_a$=1.634. That is, when liquid crystal molecules face toward random directions, i.e., no voltage was applied, the composite film became transparent.

Example 10

(Dispersing of liquid crystal into sol mixture 2)

The 100 g of sol mixture 2 of silica sol 2 and barium titanate sol prepared in Example 5 and 8 g of the liquid crystal $E_7$ were mixed together and dispersed each other to prepare a composite film containing the droplets of the liquid crystal and the sol as a matrix.

After gelation and solidification, the refractive index n of the film was 1.63 and could be made nearly consistent with that of the liquid crystal droplets $n_a$=1.634. As in Example 9, the composite film became transparent.

Example 11

(Dispersing of liquid crystal into sol mixture 3)

The 100 g of the sol mixture of silica sol 1, silica sol 2 and barium titanate sol prepared in Example 6, and 8 g of the liquid crystal $E_7$ were mixed together and dispersed each other to prepare a composite film containing the droplets of the liquid crystal and the sol as a matrix. After gelation and solidification, the refractive index n of the film was 1.63 and nearly consistent with that of the liquid crystal droplets $n_a$=1.634. As in Example 9, the composite film became transparent.

Example 12

(Dispersing of liquid crystals into polymer sol mixture)

The 100 g of the sol mixture of $BaTiO_3$ sol and polyvinyl pyrolidone prepared in Example 7 and 10 g of the liquid crystal $E_7$ were mixed together and dispersed each other to a composite film containing the droplets of the liquid crystal and the sol as a matrix. After gelation and solidification, the refractive index n of the film was 1.63 and nearly consistent with that of the liquid crystal droplets $n_a$=1.634. As in Example 9, the composite film became transparent.

Example 13

(Preparation of liquid crystal display panel)

Figure 1A:
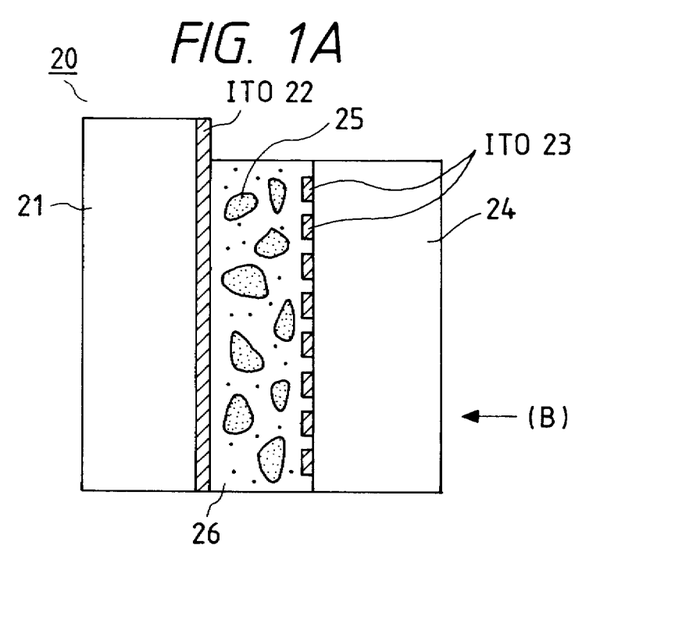
FIG. 1A is a sectional view illustrating a display panel according to the present invention.
Figure 1B:
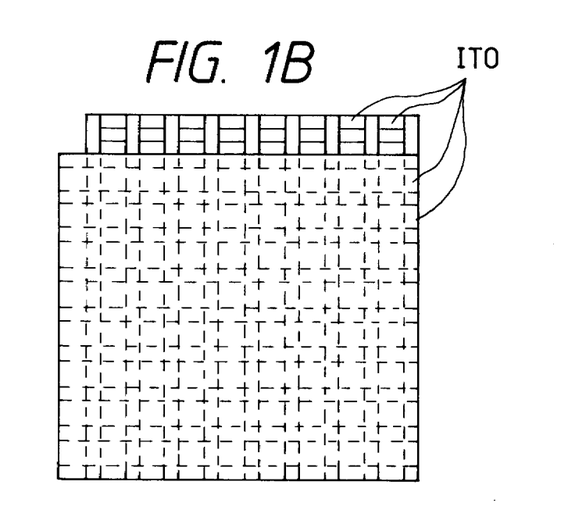
FIG. 1B is a front view illustrating a display panel according to the present invention.

The basic structure of a liquid panel 20 is seen in FIGS. 1A and 1B, where FIGS. 1A and 1B show its sectional view and its front view, respectively. On one side of each of the first substrate 21 and second substrate 24, electrodes were made out of ITO film in stripe form. The ITO film 22, 23 was formed throughout one side of each substrate by vacuum deposition or sputtering and etched in stripe form by lithography. On one side of the first substrate 21 on which side the ITO film 22 was formed, a film of the liquid crystal dispersed sol mixture prepared in Example 9 was applied by spin coating. After standing to dry, the film was subjected to heat treatment at 200° C. to prepare a gel film 26 having liquid crystal droplets 25 dispersed therein. The ITO film side of the second substrate 24 was brought into contact with, and stuck to, the gel film 26, so that the electrodes 22 in stripe form on the first substrate 21 were perpendicular to those 23 on the second substrate. With this gel film, the relative dielectric index was 37 and the film thickness was 10 microns. Accordingly, the operation was possible at a frequency of 10 Hz and a voltage of 50V. That is, when no voltage was applied, since the refractive index of the liquid crystal droplets was approximately consistent with that of the matrix, the composite film became transparent. When voltage was applied, since the refractive index $n_o$ of the liquid crystal droplets was 1.52, the difference in refractive index took place between the liquid crystal droplets and the matrix, thus the film turned into a scattering state to lose its display function.

Example 14

(Preparation of a light valve)

Figure 2:
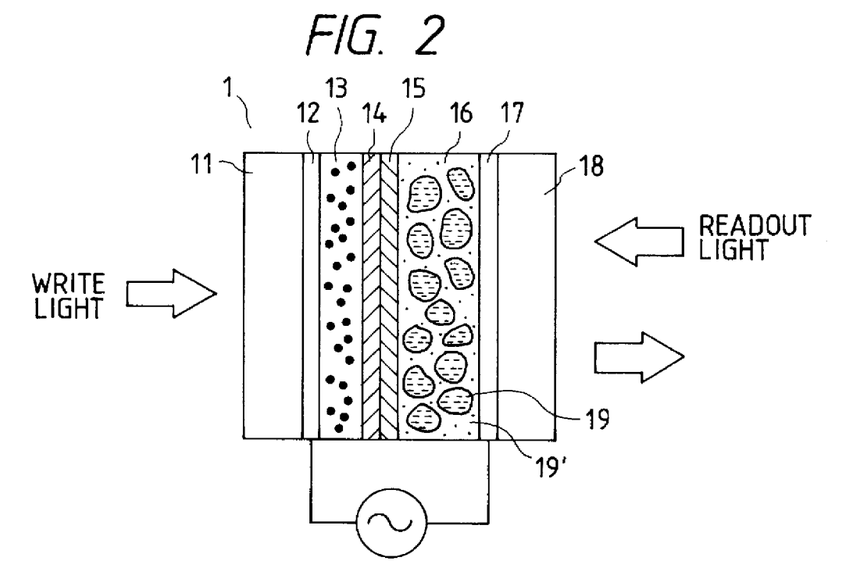
FIG. 2 is a sectional view illustrating a light valve according to the present invention.

FIG. 2 is a sectional view of one example in which the gel film prepared in Example 10 is employed as a light modulation layer of a light valve. When taken in order from the write light side (the left of FIG. 2), the components of the light valve 1 are a first glass substrate 11, an ITO film 12, a photoconductor film 13 made of hydrogenated amorphous silicon, a light shield layer 14 made of a CdTe film, a dielectric mirror film 15, a liquid crystal dispersed modulation layer 16 (which has a matrix 19' and liquid crystal droplets 19 dispersed therein) prepared from the relevant sol mixture, an ITO film 17, and a second glass substrate 18. An ITO film was formed throughout one side of each of the first glass substrate 11 and the second glass substrate 18 by high-frequency sputtering to make electrodes for applying an operating voltage. Unlike Example 13, both electrodes were formed over the whole surface. On the ITO film 12 of the first substrate 11, a hydrogenated amorphous silicon film was formed in a thickness of 20 microns by a CVD method to make a photoconductor film 13. On the photoconductor film 13, a CdTe film was formed by sputtering to make a light shield layer. On this layer, a dielectric reflecting mirror layer composed of a $TiO_2$—$SiO_2$ multi-layer film was further formed by vacuum deposition. Then, onto the dielectric reflecting mirror of the multi-layer substrate prepared in this way, a liquid crystal dispersed sol mixture prepared in Example 10 was applied by using a spin coater and allowed to stand, removing moisture, organic substances and others by heat treatment at 200° C. to make a gel film in which liquid crystal was dispersed stably. A gel film may be formed on the ITO film of the second substrate in the similar way. The ITO film side of the second substrate and the surface of the gel film were joined together and sealed up the side faces of both substrates with an adhesive to complete the light valve. With this light valve, the dielectric constant of the gel film was 40 and a film thickness of 10 microns was achieved by spin coating. As a result, a sufficient thickness for a scattering type light valve could be secured and the operation was enabled at a voltage as low as 45 V.

When write light is incident upon this valve, the impedance of the photoconductive layer decreases and almost all of the voltage is applied across the composite modulation layer so that the liquid crystal molecules in the liquid crystal droplets are oriented by the applied voltage, their refractive index shows a value of $n_o$ and write light is scattered due to the difference in the refractive index between the liquid crystal and the matrix. When no write light is incident, since the voltage is consumed by the photoconductive layer, no voltage is applied across the modulation layer, so that the refractive index of the matrix becomes nearly consistent with that of the liquid crystal droplets, the transparent state is achieved, and readout light is reflected from the mirror layer and emitted to be projection light.

Example 15

In this example, the polymer sol mixture prepared in Example 12 was used as a liquid crystal dispersed gel film used for a modulation film section similar to that of Example 14. Similar steps to those of Example 14 were repeated to form a dielectric mirror. A sol mixture film made of the liquid crystal dispersed sol mixture in Example 12 was formed on the dielectric mirror or on the ITO film of the second substrate. Also in this example, a liquid crystal dispersed sol film of 10 micron thick could be formed by spin coating. The relative dielectric constant was 25 and the voltage to be applied was able to be reduced to 65 V.

Example 16

In the foregoing examples, use was made of $n_o$ and $n_a$ in the liquid crystal, but examples in which the scattering and transparent states are formed using $n_o$ and $n_e$ will be shown below.

The 5.93 g of silica sol in Example 1 was mixed with 13.9 g of barium titanate sol to prepare a sol mixture. The ratio of $SiO_2$ to $BaTiO_3$ as the solid content was 0.682:0.318, the solid content was 4.6 wt %, the refractive index n was 1.707 and the relative dielectric constant $\in$ was 49.2. The 6 g of the above-mentioned liquid crystal $E_{100}$ was added to this sol mixture and dispersed with ultrasonic vibration. The liquid crystal dispersed sol prepared thus was applied onto a substrate similar to that used in Example 13 to form a composite film of 10 micron thick containing liquid crystal droplets. Following heat treatment at 200° C., the composite film was applied to another substrate. An AC voltage of 20V was applied between the upper and lower electrodes of the liquid crystal panel thus prepared, and the operation was made possible at two frequencies of 200 Hz and 10 Hz. When operating at 200 Hz since the liquid crystal molecules in liquid crystal droplets were orientated in parallel with the substrate, the refractive index of the liquid crystal became $n_e$=1.7072 and consequently was nearly consistent with that of the matrix so that a transparent state could be implemented. When operating at 10 Hz, since the liquid crystal molecules in liquid crystal droplets were orientated at right angles to the substrate, the refractive index of the liquid crystal became $n_o$=1.5191 and consequently was different from that of the matrix and a scattering opaque state could be attained.

Example 17

In this example, use was made of $n_o$ and n (random state) to form the scattering and transparent state.

First, barium titanate sol was synthesized as follow. The 2 mol of $H_2O$ ($HNO_3$ catalyst) was added to a 1 mol $Ti(OsecBu)_4$ solution in 2-ethoxyethanol and partial hydrolysis was carried out at 50°–60° C. A 1 mol $Ba(OC_2H_4OC_2H_5)_2$ solution in 2-ethoxyethanol was further added and alkoxylation was compositely performed to prepare $BaTiO_3$ sol, where the solid content was 5 wt %.

Next, a synthesis method for a $SiO_2$—$BaTiO_3$ sol will be described below. The 0.5 g (solid content 0.115 g) of commercially available silicon-forming solution (SR2410, manufactured by TORAY DAU) was mixed with 9.2 g of the above synthesized $BaTiO_3$ sol (solid content: 0.46 g), followed by adding 10.3 g of hexane to make $SiO_2/BaTiO_3$ sol. Then, the ratio of $SiO_2$ to $BaTiO_3$ as the solid content was 2:8, and the solid content was 2.87%, the refractive index n was 1.55 and the relative dielectric constant $\in$ was 80.

To this sol mixture, positive type liquid crystal BDH-T1203 manufactured by MERCK ($n_e$=1.7299, $\Delta n(=n_{e-no})$=0.2013, n (random state)=1.62925, $\in\|$=15.2, $\Delta\in$=11.0) was added and dispersed by ultrasonic vibration. The 3 types of liquid crystal/$SiO_2$—$BatiO_3$ composite solution were prepared so that the ratios of the liquid crystal to the solid content of $SiO_2$—$BaTiO_3$ were 2:1, 5:1 and 10:1.

The liquid crystal dispersed sol prepared thus was applied onto an ITO substrate similar to that used in Example 13 to form a composite film of 10 micron thick, containing liquid crystal droplets. After drying at room temperature, the composite film was subjected to heat treatment at 100° C. for 10 min, followed by applying another substrate. An AC voltage of several volts was applied between the electrodes of the liquid crystal display panel thus prepared and the liquid crystal display condition was observed while ON-OFF voltage operation was repeated.

In the ON state, since the liquid crystal molecules in the liquid crystal droplets were orientated at right angles to the substrate, the refractive index of the liquid crystal became $n_o$=1.5286 and consequently was nearly consistent with that of the matrix 1.55 and a transparent state could be attained. On the other hand, in the OFF state, since the liquid crystal molecules in the liquid crystal droplets were arranged at random with respect to the substrate, the refractive index of the liquid crystal became n(random state=1.63 and consequently was different from that of the matrix and a scattering opaque state appeared.

The visually inspected results of the liquid crystal display condition for three types of liquid crystal panel different in the ratio of the liquid crystal to the solid content of $SiO_2$—$BaTiO_3$ prepared above will be described below.

The liquid crystal display contrast was best when the weight ratio of the liquid crystal to the solid content of $SiO_2$—$BaTiO_3$ was 5:1, on the other hand, when the ratio was 2:1, the display section was dark as a whole and the transparency was insufficient in the ON state of the voltage operation. In addition, it was revealed that when the ratio was 10:1, the display section was transparent as a whole and the opaque level of the liquid crystal was low in the OFF state of the voltage operation.

What is claimed is:

1. A display with a liquid crystal composite layer inserted between electrodes, wherein
    said liquid crystal composite layer contains liquid crystal dispersed into an inorganic oxide matrix comprising a mixture of an inorganic oxide gel or inorganic oxide represented by the chemical formula MOx (wherein M is one or more metal elements selected from Si, La, Y, Ti, Zr, Hf, V, Nb, Ta, Al, Ga, Ge, Pb or Sb, and x is half of the total valence number of the one or more metal elements) and
    an inorganic oxide gel or inorganic oxide represented by the chemical formula ABOx (wherein A is one or more metal elements selected from alkaline earth metals, rare earth metals or Pb; wherein B is one or more metal elements selected from transition metals; and x is a number larger than 0 (zero) and not larger than 3).

2. A display according to claim 1, wherein a weight ratio of a solid content of the matrix to the liquid crystal ranges from 1:2 to 1:10.

3. A method for producing a display according to claim 1, which comprises the step of preparing the inorganic oxide gel or inorganic oxide represented by said chemical formula MOx and the inorganic oxide gel or inorganic oxide represented by said chemical formula ABOx via a sol stage in a polar solvent, wherein a liquid crystal composite layer containing liquid crystals dispersed into the inorganic oxide gel or inorganic oxide matrix is prepared by mixing liquid crystals into the matrix in the sol stage, followed by a gelation.

4. A method according to claim 3, wherein a weight ratio of a solid content of the matrix to the liquid crystal ranges from 1:2 to 1:10.

5. A display with a liquid crystal composite layer inserted between electrodes, wherein
    said liquid crystal composite layer contains liquid crystal dispersed into an inorganic-organic hybrid matrix comprising a mixture of an inorganic oxide gel or inorganic oxide represented by the chemical formula MOx (wherein M is at least one or more metal elements selected from Si, La, Y, Ti, Zr, Hf, V, Nb, Ta, Al, Ga, Ge, Pb or Sb, and x is half of the total valence number of the one or more metal elements) and an organic polymer.

6. A display according to claim 5, wherein a weight ratio of a solid content of the matrix to the liquid crystal ranges from 1:2 to 1:10.

7. A method for producing a display according to claim 5, which comprises the step of preparing said inorganic oxide gel or inorganic oxide represented by said chemical formula MOx via a sol stage in a polar solvent, wherein a liquid crystal composite layer containing liquid crystals dispersed into an inorganic-organic composite matrix is prepared by mixing an organic polymer soluble in a polar solvent with liquid crystal in the sol stage, followed by gelation.

8. A method according to claim 7, wherein a weight ratio of a solid content of the inorganic-organic hybrid matrix to the liquid crystal ranges from 1:2 to 1:10.

9. A display according to claim 5, wherein a weight ratio of a solid content of the matrix to the liquid crystal ranges from 1:2 to 1:10.

10. A display according to claim 9, wherein said refractive index of the liquid crystal is $n_o$.

11. A display according to claim 9, wherein said refractive index of the liquid crystal is $n_e$.

12. A display according to claim 9, wherein said refractive index of the liquid crystal is $n_a$.

13. A method according to claim 7, further comprising the step of adjusting a refractive index of the matrix to be substantially equal to a refractive index of the liquid crystal by controlling a mixing ratio of the inorganic oxide gel or inorganic oxide of the chemical formula MOx to the organic polymer.

14. A display with a liquid crystal composite layer inserted between electrodes, wherein
    said liquid crystal composite layer contains liquid crystals dispersed into an inorganic-organic hybrid matrix comprising an inorganic oxide gel or inorganic oxide represented by the chemical formula ABOx (wherein A is one or more metal elements selected from alkaline earth metals, rare earth metals or Pb; B is one or more metal elements selected from transition metals, and x is a number larger than 0 (zero) and not larger than 3) and an organic polymer.

15. A display according to claim 14, wherein a weight ratio of a solid content of the matrix to the liquid crystal ranges from 1:2 to 1:10.

16. A method for producing a display according to claim 14, which comprises the step of preparing said inorganic oxide gel or inorganic oxide represented by said chemical formula ABOx via a sol stage in a polar solvent, wherein a liquid crystal composite layer containing liquid crystals dispersed into an inorganic-organic hybrid matrix is prepared by mixing an organic polymer soluble in a polar solvent with liquid crystals in the sol stage, followed by gelation.

17. A method display according to claim 16, wherein a weight ratio of a solid content of the inorganic-organic hybrid matrix to the liquid crystal ranges from 1:2 to 1:10.

18. A display according to claim 14, wherein a refractive index of the matrix is substantially equal to a refractive index of the liquid crystal.

19. A display according to claim 18, wherein said refractive index of the liquid crystal is $n_o$.

20. A display according to claim 18, wherein said refractive index of the liquid crystal is $n_e$.

21. A display according to claim 18, wherein said refractive index of the liquid crystal is $n_a$.

22. A method according to claim 16, further comprising the step of adjusting a refractive index of the matrix-to be substantially equal to a refractive index of the liquid crystal by controlling a mixing ratio of the inorganic oxide gel or inorganic oxide of the chemical formula ABOx to the organic polymer.

23. A display with a liquid crystal composite layer inserted between electrodes, wherein said liquid crystal composite layer contains liquid crystals dispersed into an inorganic-organic hybrid matrix comprising a mixture of an inorganic oxide gel or inorganic oxide represented by the chemical formula MOx (where M is one or more metal elements selected from Si, La, Y, Ti, Zr, Hf, V, Nb, Ta, Al, Ga, Ge, Pb or Sb and x is half of the total valence number of the one or more metal elements), an inorganic oxide gel or inorganic oxide represented by the chemical formula ABOx (where A is one or more metal elements selected from alkaline earth metals, rare earth metals or Pb; B is one or more metal elements selected from transition metals, and x is a number larger than 0 (zero) and not larger than 3) and an organic polymer.

24. A display according to claim 23, wherein a weight ratio of a solid content of the matrix to the liquid crystal ranges from 1:2 to 1:10.

25. A method for manufacturing a display according to claim 23, which comprises the step of preparing said inorganic oxide gel or inorganic oxide represented by said chemical formula MOx and said inorganic oxide gel or inorganic oxide expressed by said chemical formula ABOx via a sol stage in a polar solvent, wherein a liquid crystal composite layer containing liquid crystal dispersed into an inorganic-organic hybrid matrix is prepared by mixing an organic polymer soluble in a polar solvent with liquid crystal in the sol stage, followed by gelation.

26. A method according to claim 25, wherein a weight ratio of a solid content of the inorganic-organic hybrid matrix to the liquid crystal ranges from 1:2 to 1:10.

27. A display according to claim 23, wherein a refractive index of the matrix is substantially equal to a refractive index of the liquid crystal.

28. A display according to claim 27, wherein said refractive index of the liquid crystal is $n_o$.

29. A display according to claim 27, wherein said refractive index of the liquid crystal is $n_e$.

30. A display according to claim 27, wherein said refractive index of the liquid crystal is $n_a$.

31. A method according to claim 25, further comprising the step of adjusting a refractive index of the matrix to be substantially equal to a refractive index of the liquid crystal by controlling a mixing ratio of the inorganic oxide gel or inorganic oxide of the chemical formula MOx, the inorganic oxide gel or inorganic oxide of the chemical formula ABOx, and the organic polymer.

32. A display with a liquid crystal composite layer inserted between electrodes, wherein said liquid crystal composite layer contains liquid crystal dispersed into an inorganic oxide matrix comprising a mixture of an inorganic oxide gel or inorganic oxide represented by the chemical formula MOx (wherein M is one or more metal elements selected from Si, La, Y, Ti, Zr, Hf, V, Nb, Ta, Al, Ga, Ge, Pb or Sb, and x is half of the total valence number of the one or more metal elements) and an inorganic oxide gel or inorganic oxide represented by the chemical formula ABOx (wherein A is one or more metal elements selected from alkaline earth metals, rare earth metals or Pb; wherein B is one or more metal elements selected from transition metals; and x is a number larger than 0 (zero) and not larger than 3), the respective amounts of inorganic oxide gel or inorganic oxide represented by the formulae MOx and ABOx being such that a refractive index of the inorganic oxide matrix is substantially equal to a refractive index of the liquid crystal.

33. A display according to claim 32, wherein a weight ration of a solid content of the matrix to the liquid crystal ranges from 1:2 to 1:10.

34. A display according to claim 32, wherein said refractive index of the liquid crystal is $n_o$.

35. A display according to claim 32, wherein said refractive index of the liquid crystal is $n_e$.

36. A display according to claim 32, wherein said refractive index of the liquid crystal is $n_a$.

37. A method for producing a display according to claim 32, which comprises the step of preparing the inorganic oxide gel or inorganic oxide represented by said chemical formula MOx and the inorganic oxide gel or inorganic oxide represented by said chemical formula ABOx via a sol stage in a polar solvent, wherein a liquid crystal composite layer containing liquid crystals dispersed into the inorganic oxide gel or inorganic oxide matrix is prepared by mixing liquid crystals into the matrix in the sol stage, followed by a gelation, and adjusting the refractive index of the matrix to be substantially equal to said refractive index of the liquid crystals by controlling a ratio of said amounts.

38. A method according to claim 37, wherein a weight ration of a solid content of the matrix to the liquid crystal ranges from 1:2 to 1:10.

* * * * *